United States Patent

Theimer

(10) Patent No.: US 6,711,542 B2
(45) Date of Patent: Mar. 23, 2004

(54) METHOD OF IDENTIFYING A LANGUAGE AND OF CONTROLLING A SPEECH SYNTHESIS UNIT AND A COMMUNICATION DEVICE

(75) Inventor: Wofgang Theimer, Bochum (DE)

(73) Assignee: Nokia Mobile Phones Ltd., Espoo (FI)

( * ) Notice: Subject to any disclaimer, the term of this patent is extended or adjusted under 35 U.S.C. 154(b) by 284 days.

(21) Appl. No.: 09/751,161

(22) Filed: Dec. 28, 2000

(65) Prior Publication Data

US 2001/0027394 A1 Oct. 4, 2001

(30) Foreign Application Priority Data

Dec. 30, 1999 (DE) .......................................... 199 63 812

(51) Int. Cl.⁷ .......................... G10L 15/18; G06F 17/28; G06F 17/27
(52) U.S. Cl. ............................... 704/257; 704/2; 704/5; 704/8; 704/9
(58) Field of Search ................................ 704/257, 240, 704/1, 9, 10, 8, 2, 5; 345/382; 382/170, 187, 190

(56) References Cited

U.S. PATENT DOCUMENTS

| 3,710,321 A | * | 1/1973 | Rubenstein | .................. 382/226 |
| 4,468,756 A | * | 8/1984 | Chan | ............................. 704/4 |
| 4,700,322 A |   | 10/1987 | Benbassat et al. | ....... 364/513.5 |

(List continued on next page.)

FOREIGN PATENT DOCUMENTS

| DE | 4101200 A1 | 7/1992 |
| DE | 19840890 A1 | 4/2000 |
| EP | 0372734 B1 | 6/1990 |
| EP | 0786132 B1 | 7/1997 |
| EP | 0889626 A1 | 1/1999 |
| EP | 1014277 A1 | 6/2000 |
| GB | 0 889 626 A1 * | 7/1997 ............ H04M/3/50 |
| GB | 2318659 | 4/1998 |

OTHER PUBLICATIONS

Li("Random Texts Exhibit Zipf's–Law–Like Word Frequency Distribution", IEEE Transactions on Information Theory, Nov. 1992).*

Chaudhury et al ("Trainable Script Identification Strategies For Indian Languages", Proceedings of the Fifth International Conference on Document Analysis and Recognition, Sep. 1999).*

Primary Examiner—Tālivaldis Ivars Šmits
Assistant Examiner—Daniel A. Nolan
(74) Attorney, Agent, or Firm—Perman & Green, LLP

(57) ABSTRACT

The invention relates to a method of identifying a language in which a text is composed in the form of a string of characters, and also to a method of controlling a speech reproduction unit and to a communication device. To be able to carry out language identification with little expenditure, it is provided according to the invention that a frequency distribution ($h_1(x)$, $h_2(x,y)$, $h_3(x,y,z)$) of letters in the text is ascertained, the ascertained frequency distribution ($h_1(x)$, $h_2(x,y)$, $h_3(x,y,z)$) is compared with corresponding frequency distributions ($l_1(x)$, $l_2(x,y)$, $l_3(x,y,z)$) of available languages, in order to ascertain similarity factors ($s_1$, $S_2$, $s_3$) which indicate the similarity of the language of the text with the available languages, and the language for which the ascertained similarity factor ($S_1$, $S_2$, $S_3$) is the greatest is established as the language of the text.

58 Claims, 3 Drawing Sheets

U.S. PATENT DOCUMENTS

Figure 1:
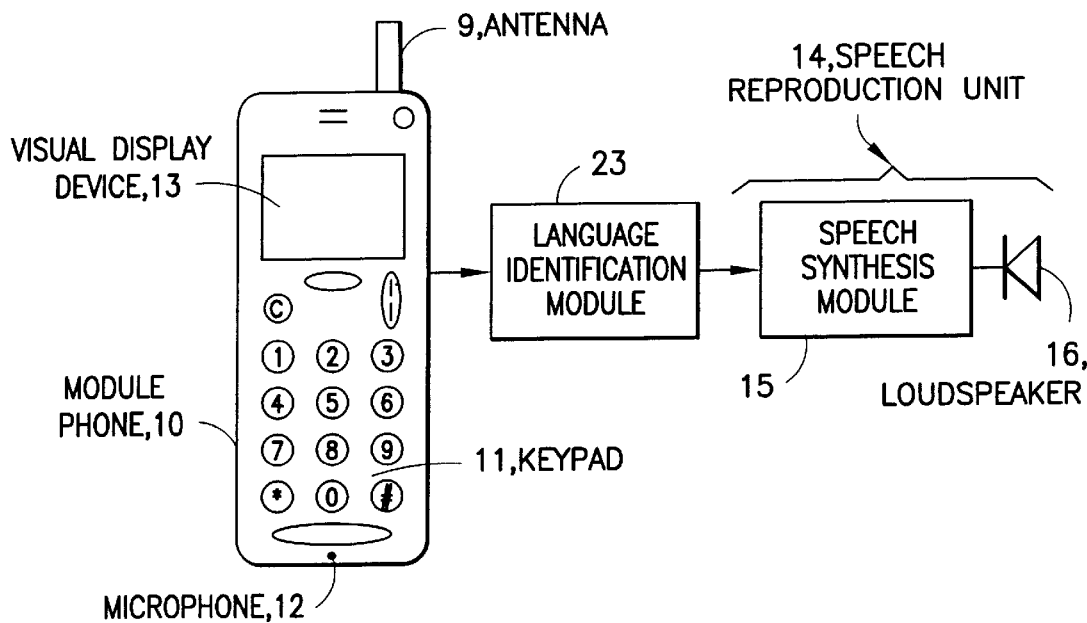

| | | | |
|---|---|---|---|
| 4,829,580 A | * 5/1989 | Church | 704/260 |
| 4,974,191 A | * 11/1990 | Amirghodsi et al. | 704/8 |
| 5,062,143 A | 10/1991 | Schmitt | 382/36 |
| 5,077,669 A | * 12/1991 | Garneau et al. | 704/8 |
| 5,383,121 A | * 1/1995 | Letkeman | 704/10 |
| 5,442,715 A | * 8/1995 | Gaborski et al. | 382/187 |
| 5,444,617 A | * 8/1995 | Merialdo | 704/9 |
| 5,664,027 A | * 9/1997 | Ittner | 382/170 |
| 5,752,051 A | * 5/1998 | Cohen | 704/1 |
| 5,865,626 A | * 2/1999 | Beattie et al. | 704/240 |
| 6,002,998 A | * 12/1999 | Martino et al. | 704/9 |
| 6,009,382 A | * 12/1999 | Martino et al. | 704/1 |
| 6,018,736 A | * 1/2000 | Gilai et al. | 704/239 |
| 6,023,670 A | * 2/2000 | Martino et al. | 704/8 |
| 6,064,767 A | * 5/2000 | Muir et al. | 382/190 |
| 6,125,362 A | * 9/2000 | Elworthy | 704/8 |
| 6,216,102 B1 | * 4/2001 | Martino et al. | 704/9 |

* cited by examiner

METHOD OF IDENTIFYING A LANGUAGE AND OF CONTROLLING A SPEECH SYNTHESIS UNIT AND A COMMUNICATION DEVICE

DESCRIPTION

The invention relates to a method of identifying a language in which a text is composed in the form of a string of characters, and also to a method of controlling a speech synthesis unit and to a communication device.

At the user interfaces of communication devices, that is to say of terminal devices used in a communication network, such as for example mobile phones or PCs (personal computers), which have a speech reproduction unit for reproducing texts, it is necessary for the reproduction of texts, in particular for the reproduction of received texts or messages, such as for example short messages (SMS), e-mails, traffic information and the like, for the language of the received text or message to be known in order to reproduce the text of the message with the correct pronunciation.

To make possible the correct pronunciation of a name by means of a speech synthesis unit, EP 0 372 734 B1 proposes a method of identifying the language of a name in which a spoken name to be reproduced is broken down into groups of letters of 3 letters each and for each of the 3-letter groups the probability of the respective 3-letter group belonging to a certain language is established, in order then to ascertain from the sum of the probabilities of all the 3-letter groups the association with a language or a language group.

In a known method (GB 2 318 659 A) of identifying a language in which a document is written, the words of a language that are used most frequently are selected for each of a multiplicity of languages available and are stored in respective word tables of the language. In order to identify the language of a document, words of the documents are compared with the most frequently used words of the various languages, the number of matches being counted. The language for which the greatest number of matches is obtained in the word-for-word comparison is then established as the language of the document.

In a further known method of identifying a language on the basis of 3-letter groups (U.S. Pat. No. 5,062,143), a text is broken down into a multiplicity of 3-letter groups in such a way that at least some of the 3-letter groups overlap neighbouring words, that is to say are given a space in the middle. The 3-letter groups obtained in this way are compared with key sets of 3-letter groups of various languages, in order to ascertain the language of a text from the ratio of groups of letters of the text matching the 3-letter groups of a key set in relation to the total number of 3-letter groups of the text.

The invention is based on the object of providing a further method of identifying a language which makes it possible with little expenditure to identify reliably the language in which the text is composed, even in the case of short texts. In addition, the invention is based on the object of providing a method of controlling a speech synthesis unit and a communication device with which correct speech reproduction is possible for various languages with little expenditure.

This object is achieved by the methods according to claims 1 and 14 and by the communication device according to claim 15.

Thus, according to the invention, a frequency distribution of letters in a text of which the language is sought is ascertained. This frequency distribution is compared with corresponding frequency distributions of available languages, in order to establish similarity factors which indicate to what extent the ascertained frequency distribution coincides with the frequency distributions of each available language. The language for which the ascertained similarity factor is the greatest is then established as the language of the text. In this case, it is expedient if the language is established only if the greatest similarity factor ascertained is greater than a threshold value.

Thus, according to the invention, the statistical distribution of letters, that is to say of individual letters, groups of 2 letters or groups of more than 2 letters, in a text to be analysed is established and compared with corresponding statistical distributions of the languages respectively available. This procedure requires relatively low computer capacities and relatively little storage space in its implementation.

In an advantageous development of the invention, it is provided that the ascertained frequency distribution is stored as the frequency distribution of a new language or is added to a corresponding frequency distribution of a language if, in response to an inquiry, a language to which the ascertained frequency distribution is to be assigned is indicated. In this way, it is made possible in a self-learning process for frequency distributions to be produced for further languages or, if a frequency distribution for this language has already been stored, to increase its statistical reliability.

In an advantageous development of the invention, it may be provided that the ascertained frequency distribution is added to the corresponding frequency distribution of the language established. As a result, the statistical reliability of stored frequency distributions of available languages can be automatically further improved, without the user needing to intervene.

In order to facilitate the processing of the text when ascertaining the frequency distribution of letters and groups of letters in the text, it is provided in an advantageous development of the invention that all non-letter characters, apart from spaces, are removed from the string of characters of the text, in order to ascertain from the string of characters thus obtained frequency distributions of letters and groups of letters in the text.

In another development of the invention, it is provided that the length of the text is established and, depending on the length of the text, one, two or more frequency distributions of letters and groups of letters in the text are ascertained, the length of the text being established as the number of letters in the text and the number of letters in the text being compared with the number of letters in an alphabet, in order to determine which frequency distributions are ascertained.

In this way, the computing effort in ascertaining the frequency distribution or frequency distributions and in the subsequent comparison of the frequency distributions for establishing similarity factors can be reduced, without significantly impairing the reliability of the language identification, since only the ascertainment of those frequency distributions of which the statistical significance would be only extremely low is omitted.

In particular, it is expedient that the frequency distributions of groups of letters with three letters, of groups of letters with two letters and of individual letters are ascertained if the number of letters in the text is greater than the square of the number of letters in the alphabet. Thus, if the number of letters in the text is very great, it is advantageous if not only the frequency distributions of individual letters and of 2-letter groups but also the frequency distribution of 3-letter groups are ascertained, whereby the statistical reliability of the overall finding is significantly increased.

If there is a reduced number of letters in the text, which is greater than the number of letters in the alphabet but less than its square, the frequency distributions of groups of letters with 2 letters and of individual letters are ascertained. If the number of letters in the text is less than the number of letters in the alphabet, expediently only the frequency distribution of individual letters is ascertained, since the statistical significance of the frequency distributions of groups of letters is then practically no longer assured in the method of evaluation according to the invention.

A particularly expedient development of the invention is distinguished by the fact that a complete alphabet is used, including special letters of various languages based on Latin letters. The use of a complete alphabet, that is to say an alphabet which contains not only the Latin letters common to all languages using Latin letters but also the special letters based on Latin letters, such as for example ä, ö, ü in German, é, ç in French or å in Swedish, means that every text to be analysed can be processed in the same way, without the letters first having to be investigated for special letters, in order to choose the corresponding alphabet. As a result, a significant simplification of the method according to the invention can thus be achieved.

To speed up the identification of the language in which the text is composed, it is expedient if the letters present in the text are investigated for special letters, in order to select according to the presence or absence of special letters characteristic of certain languages the languages which are to be taken into consideration in the comparison of the ascertained frequency distribution with corresponding frequency distributions of available languages.

In addition, it may be provided that, after establishing the language, the letters present in the text are investigated for special letters which are characteristic of the language established and of languages not established, in order to confirm the language established. By comparing special letters present in the text to be analysed with the special letters of a language established, it can be established in a simple way to what extent the language established for the text is plausible for it.

The method according to the invention can be used particularly expediently for identifying a language in a method of controlling a speech synthesis unit, in which the language established in the language identification according to the invention is transmitted to a speech synthesis unit, in which the pronunciation rules of the language established are selected and used for the synthetic speech reproduction of the text by a speech synthesis module of the speech reproduction unit.

In a communication device according to the invention, which has not only a receiving module and a speech synthesis module but also a language identification module, it is provided that a text to be output by the speech synthesis module can be fed to the language identification module for identifying the language in which the text to be output is composed, and that the language identification module is connected to the speech synthesis module for transmitting a language established for this text.

It is expediently provided in this case that pronunciation rules for various languages are stored in the speech synthesis module, a pronunciation-rules selection circuit being provided in the speech synthesis module, which circuit is connected to the language identification module and, depending on the language transmitted by the language identification module, selects the corresponding pronunciation rule, so that it can be used by a speech synthesis unit of the speech synthesis module.

In order to be able to carry out a language identification simply and effectively in the communication device according to the invention, it is provided that the language identification module comprises a filter circuit, in order to remove all non-letter characters, apart from spaces, from a string of characters of a text.

Furthermore, it is expedient if the language identification module comprises a statistics circuit, in order to ascertain a frequency distribution of letters in the text, the statistics circuit having first, second and third computing circuits, in order to ascertain frequency distributions of individual letters, of groups of letters with two letters and of groups of letters with three letters.

An expedient development of the invention is distinguished by the fact that the language identification module has a comparator circuit, in order to compare for the ascertainment of similarity factors for a text ascertained frequency distributions of letters with corresponding stored frequency distributions of available languages, the language identification module comprising an evaluation circuit, to which the similarity factors can be fed by the comparator circuit in order to establish the language for which the ascertained similarity factor is greatest as the language of the text.

Figure 2:
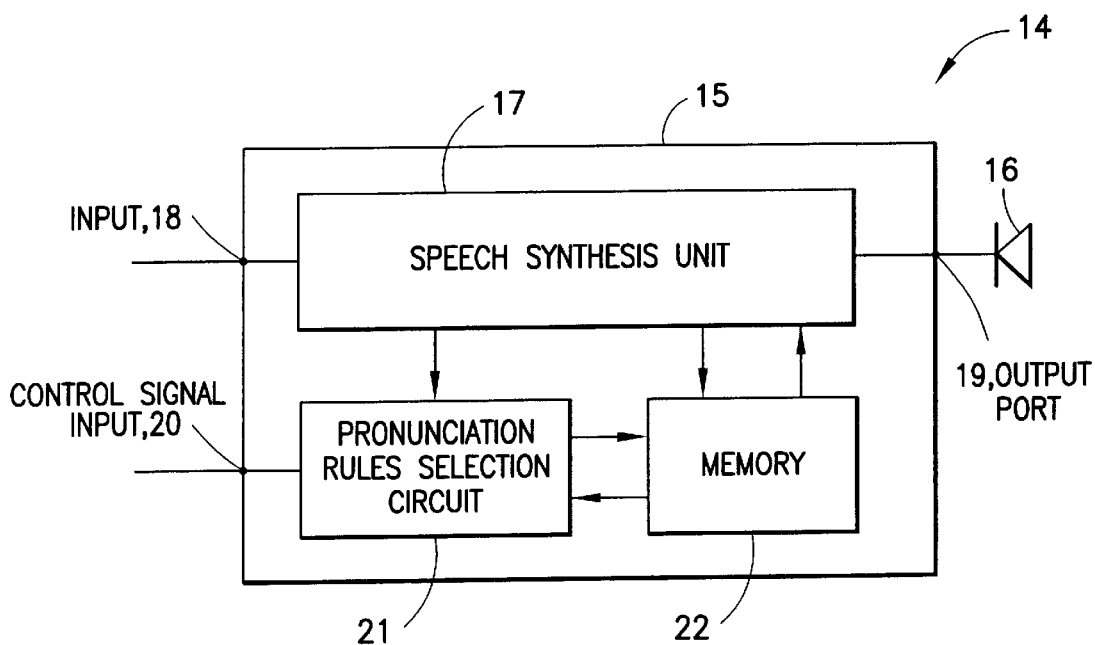
Figure 3:
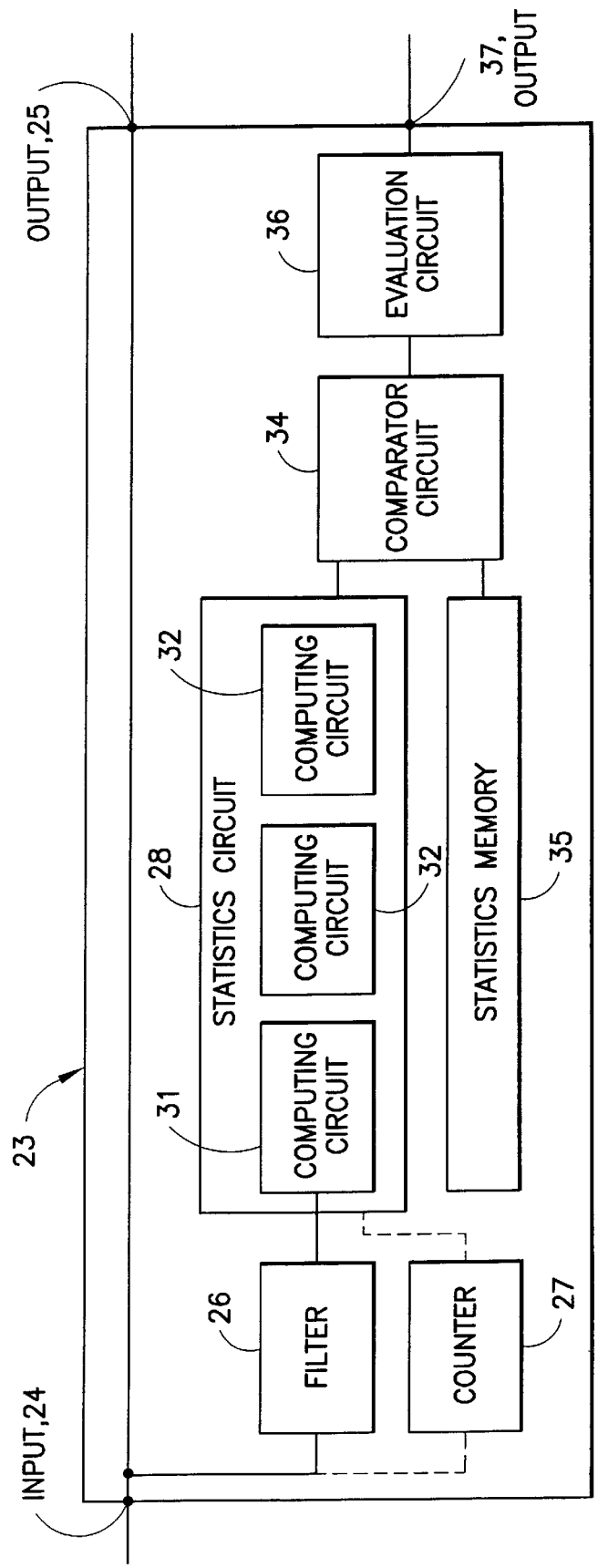
Figure 4:
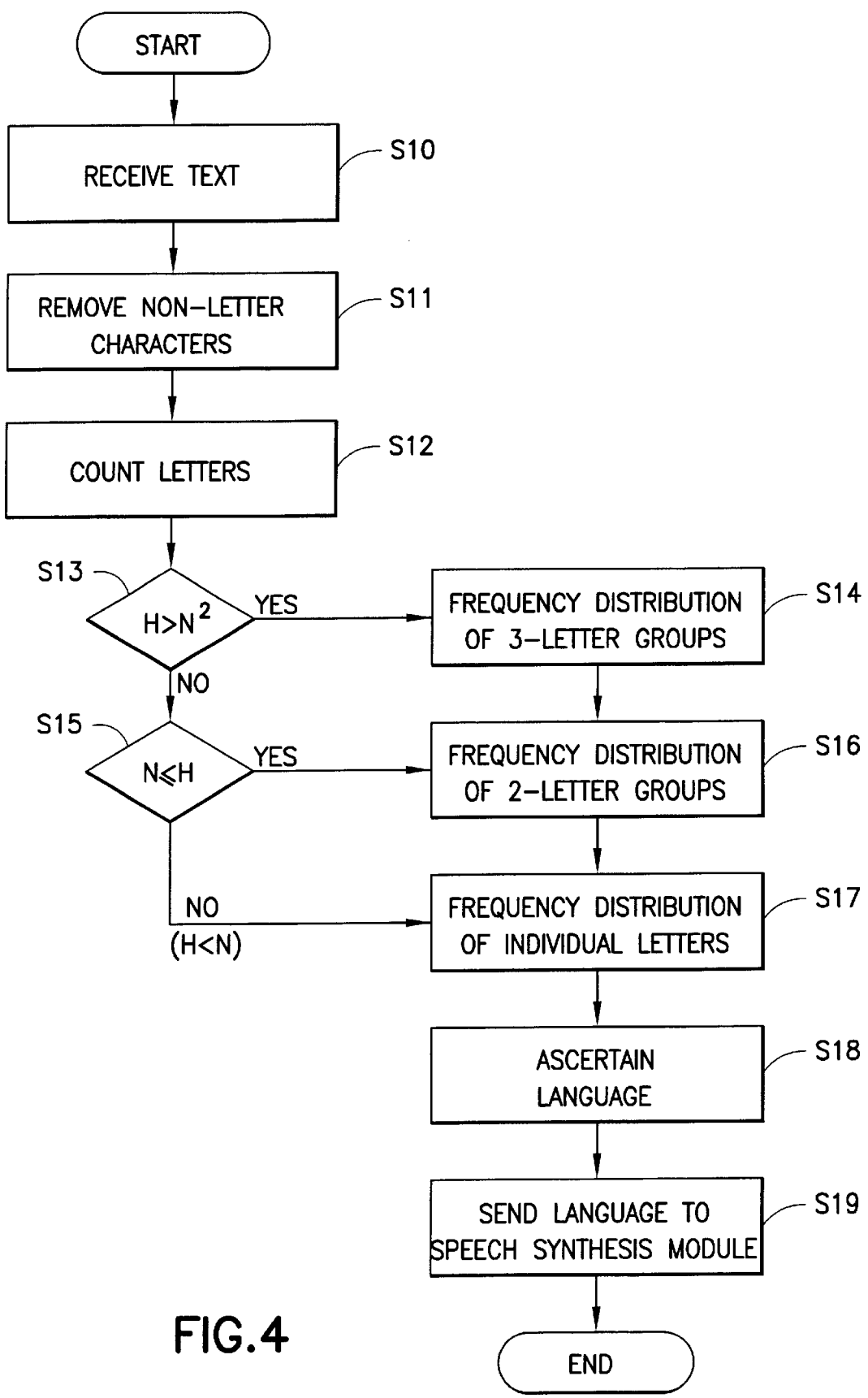

The invention is explained in more detail below by way of example with reference to the drawing, in which FIG. 1 shows a simplified, schematic block diagram of a communication device, FIG. 2 shows a simplified, schematic block diagram of a speech reproduction unit of the communication device from FIG. 1, FIG. 3 shows a simplified, schematic block diagram of a language identification module of the communication device from FIG. 1 and FIG. 4 shows a simplified flow diagram to illustrate the method according to the invention of identifying a language.

In the various figures of the drawing, elements corresponding to one another are provided with the same reference numerals.

As FIG. 1 shows, a communication device according to the invention has, as a receiving module, for example a mobile phone 10 with a central control unit, not specifically represented, and a user interface, which comprises a keypad 11, a microphone 12, a visual display device 13 and a speech reproduction unit 14. The speech reproduction unit 14 is made up of a speech synthesis module 15 and a loudspeaker 16, serving as a speech output unit.

As represented in FIG. 2, provided in the speech synthesis module 15 is a speech synthesis unit 17, to the input 18 of which a spoken text to be reproduced is fed, while a speech output port 19 is connected to the loudspeaker 16. A control signal input 20, via which a language selection signal indicating the language of the text to be reproduced can be fed to the speech synthesis module 15, is routed to a pronunciation-rules selection circuit 21. Pronunciation rules for various languages, that is to say for example for German, English, Finnish, French, etc., are stored in a memory 22.

With the aid of the pronunciation-rules selection circuit 21, the pronunciation rules respectively required are made available to the speech synthesis unit 17 from the memory 22. For this purpose, on the one hand it is possible that, depending on the language selection signal present, the pronunciation-rules selection circuit 21 reads the corresponding pronunciation rules from the memory 22 and transmits them to the speech synthesis unit 17. On the other hand, it may also be provided that the pronunciation-rules selection circuit 21 transmits to the speech synthesis unit 17 only those memory addresses at which the corresponding pronunciation rules are stored, so that the speech synthesis unit 17 itself reads the corresponding pronunciation rules in the memory 22.

Arranged between the central control unit of the receiving module for receiving, processing and managing information, that is to say the mobile phone 10, and the speech reproduction unit 14 is a language identification module 23, which has, as schematically represented in FIG. 3, an input 24 for receiving a spoken text to be reproduced. The input 24 is connected directly or else via a delay line or a buffer memory to an output 25, which is connected to the input 18 of the speech synthesis unit 17. In addition, the input 24 is routed to a filter circuit 26, in which all non-letter characters, apart from spaces, are removed from a string of characters of a text. The filter circuit 26 may in this case serve at the same time as a counter. It is also possible, however, that a counter 27 is provided, in order to ascertain the number H of letters in a text.

Connected to the filter circuit 26 is a statistics circuit 28, in order to ascertain frequency distributions $h_1(x)$, $h_2(x,y)$, $h_3(x,y,z)$. The statistics circuit 28 expediently has for this purpose first, second and third computing circuits 31, 32, 33, in order to ascertain a frequency distribution $h_1(x)$ of individual letters, a frequency distribution $h_2(x,y)$ of 2-letter groups and a frequency distribution $h_3(x,y,z)$ of 3-letter groups.

The frequency distributions $h_1$, $h_2$, $h_3$ ascertained in the statistics circuit 28 are fed to a comparator circuit 34, to which frequency distributions $l_1(x)$, $l_2(x,y)$, $l_3(x,y,z)$ of individual letters, 2-letter groups and 3-letter groups of available languages stored in a statistics memory 35 are also fed. Similarity factors $s_1$, $s_2$, $s_3$ ascertained by the comparator circuit 34 are fed to an evaluation circuit 36, which establishes from the similarity factors $s_1$, $s_2$, $s_3$ the language of the text. An output 37 of the evaluation circuit 36 is connected to the control signal input 20 of the speech synthesis module 15, in order to feed a language selection signal to the latter.

As soon as the mobile phone 10 receives via its air interface with the mobile radio network, indicated as antenna 9, a message, for example a short message, an e-mail, or traffic information, which is to be output as spoken text via the speech reproduction unit 14, the text present as a string of characters is transmitted to the language identification module 23, which consequently receives it in step S10.

Before the text received in step S10 is subjected to a statistical analysis, all non-letter characters, such as for example numbers, typesetting marks, line spacing marks and other special characters, are removed from the string of characters of the text concerned in the step S11. When doing so, only spaces indicating the separation of individual words are left in the string of characters. Excess spaces, however, are likewise removed.

Assuming, for example, that the following text is concerned:

"Dies.ist.ein.Satzbeispiel, . . . das.zeigen.soll, . . . wie. die.Buchstabenstatistiken.im.einzelnen.berechnet.werden !"

(Here the character "." in each case represents a space, in order to illustrate the representation of the spaces.) Thus, after removal of the non-letter characters and the excess spaces, the following string of characters is obtained:

".Dies.ist.ein.Satzbeispiel.das.zeigen.soll.wie.die.Buc hstabenstatistiken.im.einzelnen.berechnet.werden."

For removing the non-letter characters and the excess spaces, in the step S11, which is preferably performed in the filter circuit 26, in each case a character is read and checked for whether the character read is a space or a letter. If this is the case, it is inquired once again whether the character read is a space. If this is not the case, the character read is stored. At the same time, a numerical value for the number H of letters in the text may be incremented by 1 (step S12). The counting of the letters in the text, that is to say step S12, may, however, also be carried out in a separate counter 27.

If in the second inquiry the character read is a space, it is checked whether the character last stored was also already a space. If the character last stored was a letter, the space is stored and, if there are further characters, the next character is read. If, however, it is established that the character last stored was likewise a space, the next character is directly read.

Also when the letter respectively read is not a letter or space, the procedure moves on directly to reading the next character.

Once the text to be analysed has been prepared in this way, and the number H of letters in the text has been counted, it is checked in the step S13 whether the number H of letters in the text is greater than the square $N^2$ of the number N of letters in the complete alphabet used. If this is the case, a frequency distribution of 3-letter groups is ascertained in the step S14. If, however, the number H is not greater than the square $N^2$ of the number N, it is checked in the step S15 whether the number N of letters in the alphabet is less than or equal to the number H of letters in the text. If this is the case, the frequency distribution of 2-letter groups is ascertained in the step S16. Otherwise, the method proceeds to step S17, where the frequency distribution of individual letters is established.

After ascertaining a frequency distribution in step S14 or S16 for 3-letter groups or 2-letter groups, the procedure continues with the ascertainment of frequency distributions in step S16 or S17, so that two or three different frequency distributions $h_1$, $h_2$, $h_3$ are ascertained for each text, according to the number H of letters present in it.

For ascertaining the individual letter statistics in step S17, that is to say for ascertaining the frequency distribution of $h_1(x)$ of the individual letters in the text, the number n (x) of each letter in the text is ascertained for each letter x (x=a,b,c . . . ). Once it has been established for each letter in the alphabet how frequently it occurs in the text, the corresponding values are divided by the total number H of letters in the text, in order to obtain in this way the frequency distribution $h_1(x)=n(x)/H$.

For the 2-letter statistics, that is to say for the ascertainment of the frequency distribution of 2-letter groups in the step S16, the entire text is subdivided into 2-letter groups. In this case, for example, the word "DIES" is broken down into the following 2-letter groups, taking the spaces into account: ".D", "DI", "IE", "ES", "S."

For every possible combination of two letters of the alphabet used, that is to say preferably the complete alphabet with all the special letters used in Western languages that are derived from the customary Latin letters, the number n (x,y) of times each 2-letter combination is present in the text is then ascertained. In order to obtain the frequency distribution $h_2(x,y)$, the number of each individual 2-letter group is then divided by the total number of 2-letter groups in the text.

In a corresponding way, in the 3-letter statistics, that is to say when ascertaining the frequency distribution of 3-letter groups, the text is broken down into 3-letter groups. When doing so, it must be taken into account that no space may occur in the middle of a 3-letter group. For example, a text "DIES IST EIN" gives rise to the following 3-letter groups: ".DI", "DIE", "IES", "ES. ", ".IS", "IST", "ST. ", ".EI", "EIN", "IN."

Here, too, it is then established in a corresponding way for every possible 3-letter group x,y,z how often it occurs in the text. The individual numbers n (x,y,z) of the individual 3-letter groups are then divided by the total number of 3-letter groups, in order to obtain the frequency distribution $h_3(x,y,z)$ for 3-letter groups.

Corresponding frequency distributions $l_1(x)$, $l_2(x,y)$ and $l_3(x,y,z)$ of individual letters, 2-letter groups and 3-letter groups are stored for each available language in the statistics memory 35. For ascertaining the language in the step S18, the ascertained frequency distributions $h_1$, $h_2$, $h_3$ are compared with the corresponding stored frequency distributions $l_1$, $l_2$, $l_3$ for the available languages, in order to determine similarity values $s_1$, $S_2$, $S_3$ from this comparison.

For this purpose, for each letter, each 2-letter group and each 3-letter group, the difference between the frequency in the text and the frequency in a specific language is calculated and divided by the sum of the corresponding frequencies. The values thus ascertained are summated, normalized by dividing by the number N of possible letters or the number $N^2$ of possible 2-letter groups or the number $N^3$ of possible 3-letter groups and respectively subtracted from 1. The individual similarity factors $s_1$, $S_2$, $s_3$ are thus obtained by the following equations:

$$s_1 = 1 - \frac{1}{N}\sum_x \frac{|h_1(x) - l_1(x)|}{h_1(x) + l_1(x)}$$

$$s_2 = 2 - \frac{1}{N}\sum_x \frac{|h_1(x) - l_1(x)|}{h_1(x) + l_1(x)} - \frac{1}{N^2}\sum_{x,y} \frac{|h_2(x,y) - l_2(x,y)|}{h_2(x,y) + l_2(x,y)}$$

$$s_3 = 3 - \frac{1}{N}\sum_x \frac{|h_1(x) - l_1(x)|}{h_1(x) + l_1(x)} - \frac{1}{N^2}\sum_{x,y} \frac{|h_2(x,y) - l_2(x,y)|}{h_2(x,y) + l_2(x,y)} - \frac{1}{N^3}\sum_{x,y,z} \frac{|h_3(x,y,z) - l_3(x,y,z)|}{h_3(x,y,z) + l_3(x,y,z)}$$

For very short messages, the number of letters H of which is less than the number N of letters in the alphabet used, only the individual letter statistics are carried out and a similarity factor $s_1$, which lies between 0 and 1, is calculated. In this case, 0 means no match between the compared frequency distributions $h_1$ and $l_1$, while 1 indicates a complete match. Usually, however, the value lies between these extremes.

For texts of medium length, that is to say for texts of which the number of letters H lies between N and $N^2$, the frequency distribution of 2-letter groups is additionally determined and compared with the corresponding frequency distributions of the individual languages. For very long texts, the comparison of the frequency distributions of 3-letter groups is then also added as 3-letter statistics.

Thus, once the similarity values $s_1(Li)$ for various available languages Li have been ascertained for example for a short text with less than N letters, the greatest value of the similarity factors $s_1(Li)$ is determined. If this greatest value of $s_1(Li)$, that is to say $\max(s_1(Li)) \geq S_{1,threshold}$, the language Li is established as the language of the text and, in the step S19, is passed on to the speech synthesis module 15.

In the speech synthesis module 15, the pronunciation rules belonging to the language Li are then selected, so that the speech synthesis unit 17 can use these in the generation of speech.

If, depending on the length of the text to be reproduced, the similarity factors $S_2$ and, if appropriate, $S_3$ are also ascertained, corresponding threshold values are used for this purpose, in order to ensure reliable language identification.

If it was not possible to establish the language of the text with the necessary reliability, because for example the text was composed in a language for which no frequency distributions are stored in the communication device according to the invention, or because the text comprises too few characters, the user is firstly informed that it has not been possible to establish the language of the text and that therefore initially no spoken text output is to be provided.

The user then has the possibility of entering a language himself in order to start a speech output. In addition, there is the possibility of storing the calculated frequency distribution or distributions under the name of the language entered by the user as frequency distribution $l_1$, $l_2$, $l_3$ in the statistics memory 35 of the language identification module 23.

If the mobile phone receives messages in this new language quite frequently, the frequency distributions respectively ascertained can be added to the frequency distributions already stored, so that the stored frequency distributions $l_1$, $l_2$, $l_3$ of the new language Ln gain an increasingly greater statistical reliability.

It may expediently also be provided that already stored frequency distributions $l_1$, $l_2$, $l_3$ are also further supplemented, in order to improve the statistical reliability of the stored frequency distributions.

In order for the result of the language identification to be additionally checked, it is also possible after establishing a language Li as the language of the analysed text to compare special letters of the established language with special letters in the text, in order to establish whether the language ascertained is plausible. If, for example, German is ascertained as the language of the text, and modified characters such as ä, ö, ü occur in the text, this establishment of the language can be considered to be assured. The same would apply if, in the case of modified characters, the Turkish language were established as the language of the text.

Such a comparison of special letters may, however, also be carried out before the comparison of the ascertained frequency distributions with the stored frequency distributions of the available languages, in order to rule out those languages in which corresponding special letters do not occur.

The method according to the invention of identifying a language in which a text is composed can be used wherever the further processing of the text requires knowledge of its language. A preferred example of an application is speech synthesis in the speech reproduction of e-mails, short messages, traffic information in the form of text and the like. In addition, the method according to the invention can also be used wherever a text of which the language is unknown is to be translated into a target language in a translation program.

Although the invention has only been explained with regard to mobile phones used with telecommunication networks, a personal computer connected to the Internet or a computer connected only via a telephone line to another data-processing system may also be used as the communication device.

What is claimed is:

1. Method of identifying a language in which a text is composed as a string of characters, in which a frequency distribution of letters in the text is ascertained, the ascertained frequency distribution is compared with corresponding frequency distributions of available languages, in order to ascertain similarity factors which indicate the similarity of the language of the text with the available languages, and the language for which the ascertained similarity factor is the greatest is established as the language of the text;

wherein the length of the text is established and, depending on the length of the text, one, two or more frequency distributions of letters and groups of letters in the text are ascertained; and the length of the text is established as the number of letters in the text and in that the number of letters in the text is compared with the number of letters in an alphabet, in order to determine which frequency distribution are ascertained.

2. Method according to claim 1, wherein the language is only established if the greatest similarity factor ascertained is greater than a threshold value.

3. Method according to claim 1, wherein the ascertained frequency distribution is stored as the frequency distribution of a new language or is added to a corresponding frequency distribution of a language if, in response to an inquiry, a language to which the ascertained frequency distribution is to be assigned is indicated.

4. Method according to claim 1, wherein the ascertained frequency distribution is added to the corresponding frequency distribution of the language established.

5. Method according to claim 1, wherein all non-letter characters, apart from spaces, are removed from the string of characters of the text, in order to ascertain from the string of characters thus obtained frequency distributions of letters and groups of letters in the text.

6. Method according to claim 1, wherein the frequency distributions of groups of letters with three letters, of groups of letters with two letters and of individual letters are ascertained if the number of letters in the text is greater than the square of the number of letters in the alphabet.

7. Method according to claim 1, wherein the frequency distributions of groups of letters with two letters and of individual letters are ascertained if the number of letters in the text is greater than the number of letters in the alphabet.

8. Method according to claim 1, wherein the frequency distribution of individual letters is ascertained if the number of letters in the text is less than the number of letters in the alphabet.

9. Method according to claim 1, wherein a complete alphabet is used, also including special letters of various languages based on Latin letters.

10. Method according to claim 1, wherein the letters present in the text are investigated for special letters, in order to select according to the presence or absence of special letters, characteristic of certain languages the languages which are to be taken into consideration in the comparison of the ascertained frequency distribution with corresponding frequency distributions of available languages.

11. Method according to claim 1, wherein after establishing the language, the letters present in the text are investigated for special letters which are characteristic of the languages established and of languages not established, in order to confirm the language established.

12. A Method of controlling a speech reproduction unit, in which a language identification according to claim 1 is carried out for a text to be output in spoken form by means of a speech synthesis module of the speech reproduction unit, the language thereby established is transmitted to the speech reproduction unit, and in the speech reproduction unit, the pronunciation rules of the language established are selected and used for the synthetic speech reproduction of the text by the speech synthesis module.

13. Communication device with a receiving module for receiving, processing and managing information, a speech synthesis module, which for the spoken output of texts is in connection with the receiving module, and a language identification module, to which a text to be output by the speech synthesis module can be fed for identifying the language in which the text to be output is composed, and which is connected to the speech synthesis module for transmitting a language established for this text;

wherein the language identification module comprises a statistics circuit, in order to ascertain a frequency distribution of letters in the text, and the statistics circuit has first, second and third computing circuits, in order to ascertain frequency distributions of individual letters, of groups of letters with two letters and of groups of letters with three letters.

14. Communication device according to claim 13, wherein pronunciation rules for various languages are stored in the speech synthesis module.

15. Communication device according to claim 14, wherein a pronunciation-rules selection circuit is provided in the speech synthesis module, which circuit is connected to the language identification module and, depending on the language transmitted by the language identification module, selects the corresponding pronunciation rule, so that it can be used by a speech synthesis unit of the speech synthesis module.

16. Communication device according to claim 13, wherein the language identification module comprises a filter circuit, in order to remove all non-letter characters, apart from spaces, from a setting of characters of a text.

17. Communication device according to claim 13, wherein the language identification module has a comparator circuit, in order to compare for the ascertainment of similarly factors for a text ascertained frequency distributions of letters with corresponding stored frequency distributions of available languages.

18. Communication device according to claim 17, wherein the language identification module comprises an evaluation circuit, to which the similarity factors can be fed by the comparator circuit, in order to establish the language for which the ascertained similarity factor is greatest as the language of the text.

19. Method of identifying a language in which a text is composed as a string of characters, in which a frequency distribution of letters in the text is ascertained, the ascertained frequency distribution is compared with corresponding frequency distributions of available languages, in order to ascertain similarity factors which indicate the similarity of the language of the text with the available languages, and the language for which the ascertained similarity factor is the greatest is established as the language of the text;

wherein the letters present in the text are investigated for special letters, in order to select according to the presence or absence of special letters, characteristic of certain languages the languages which are to be taken into consideration in the comparison of the ascertained frequency distribution with corresponding frequency distributions of available languages.

20. Method according to claim 19, wherein the language is only established if the greatest similarity factor ascertained is greater than a threshold value.

21. Method according to claim 19, wherein the ascertained frequency distribution is stored as the frequency distribution of a new language or is added to a corresponding frequency distribution of a language if, in response to an inquiry, a language to which the ascertained frequency distribution is to be assigned is indicated.

22. Method according to claim 19, wherein the ascertained frequency distribution is added to the corresponding frequency distribution of the language established.

23. Method according to claim 19, wherein all non-letter characters, apart from spaces, are removed from the string of characters of the text, in order to ascertain from the string of characters thus obtained frequency distributions of letters and groups of letters in the text.

24. Method according to claim 19, wherein the length of the text is established and, depending on the length of the text, one, two or more frequency distributions of letters and groups of letters in the text are ascertained.

25. Method according to claim 24, wherein the length of the text is established as the number of letters in the text and in that the number of letters in the text is compared with the number of letters in the alphabet, in order to determine which frequency distributions are ascertained; and the frequency distributions of groups of letters with three letters, of groups of letters with two letters and of individual letters are ascertained if the number of letters in the text is greater than the square of the number of letters in the alphabet.

26. Method according to claim 24, wherein the length of the text is established as the number of letters in the text and in that the number of letters in the text is compared with the number of letters in an alphabet, in order to determine which frequency distributions are ascertained, and the frequency distributions of groups of letters with two letters and of individual letters are ascertained if the number of letters in the text is greater than the number of letters in the alphabet.

27. Method according to claim 24, wherein the length of the text is established as the number of letters in the text and in that the number of letters in the text is compared with the number of letters in the alphabet, in order to determine which frequency distributions are ascertained; and the frequency distribution of individual letters is ascertained if the number of letters in the text is less than the number of letters in the alphabet.

28. Method according to claim 19, wherein a complete alphabet is used, also including special letters of various languages based on Latin letters.

29. Method according to claim 19, wherein after establishing the language, the letters present in the text are investigated for special letters which are characteristic of the language established and of languages not established, in order to confirm the language established.

30. Method of controlling a speech reproduction unit, in which a language identification according to claim 19 is carried out for a text to be output in spoken form by means of a speech synthesis module of the speech reproduction unit, the language thereby established is transmitted to the speech reproduction unit, and in the speech reproduction unit, the pronunciation rules of the language established are selected and used for the synthetic speech reproduction of the text by the speech synthesis module.

31. Method of identifying a language in which a text is composed as a string of characters, in which a frequency distribution of letters in the text is ascertained, the ascertained frequency distribution is compared with corresponding frequency distributions of available languages, in order to ascertain similarity factors which indicate the similarity of the language of the text with the available languages, and the language for which the ascertained similarity factor is the greatest is established as the language of the text;

wherein after establishing the language, the letters present in the text are investigated for special letters which are characteristic of the language established and of languages not established, in order to confirm the language established.

32. Method according to claim 31, wherein the language is only established if the greatest similarity factor ascertained is greater than a threshold value.

33. Method according to claim 31, wherein the ascertained frequency distribution is stored as the frequency distribution of a new language or is added to a corresponding frequency distribution of a language if, in response to an inquiry, a language to which the ascertained frequency distribution is to be assigned is indicated.

34. Method according to claim 31, wherein the ascertained frequency distribution is added to the corresponding frequency distribution of the language established.

35. Method according to claim 31, characterized in that all non-letter characters, apart from spaces, are removed from the string of characters of the text, in order to ascertain from the string of characters thus obtained frequency distributions of letters and groups of letters in the text.

36. Method according to claim 31, wherein the length of the text is established and, depending on the length of the text, one, two or more frequency distributions of letters and groups of letters in the text are ascertained.

37. Method according to claim 36, wherein the length of the text is established as the number of letters in the text and in that the number of letters in the text is compared with the number of letters in an alphabet, in order to determine which frequency distributions are ascertained; and the frequency distributions of groups of letters with three letters, of groups of letters with two letters and of individual letters are ascertained if the number of letters in the text is greater than the square of the number of letters in the alphabet.

38. Method according to claim 36, wherein the length of the text is established as the number of letters in the text and in that the number of letters in the text is compared with the number of letters in the alphabet, in order to determine which frequency distributions are ascertained; and the frequency distributions of groups of letters with two letters and of individual letters are ascertained if the number of letters in the text is greater than the number of letters in the alphabet.

39. Method according to claim 36, wherein the length of the text is established as the number of letters in the text and in that the number of letters in the text is compared with the number of letters in an alphabet, in order to determine which frequency distributions are ascertained; and the frequency distribution of individual letters is ascertained if the number of letters in the text is less than the number of letters in the alphabet.

40. Method according to claim 31, wherein a complete alphabet is used, also including special letters of various languages based on Latin letters.

41. Method of controlling a speech reproduction unit, in which
a language identification according to claim 35 is carried out for a text to be output in spoken form by means of a speech synthesis module of the speech reproduction unit,
the language thereby established is transmitted to the speech reproduction unit, and
in the speech reproduction unit, the pronunciation rules of the language established are selected and used for the synthetic speech reproduction of the text by the speech synthesis module.

42. Method of identifying a language in which a text is composed as a string of characters, in which
a frequency distribution of letters in the text is ascertained,
the ascertained frequency distribution is compared with corresponding frequency distributions of available languages, in order to ascertain similarity factors which indicate the similarity of the language of the text with the available languages, and
the language for which the ascertained similarity factor is the greatest is established as the language of the text;
wherein the length of the text is established and, depending on the length of the text, one, two or more frequency distributions of letters and groups of letters in the text are ascertained.

43. Method according to claim 42, wherein the language is only established if the greatest similarity factor ascertained is greater than a threshold value.

44. Method according to claim 42, wherein in that the ascertained frequency distribution is stored as the frequency distribution of a new language or is added to a corresponding frequency distribution of a language if, in response to an inquiry, a language to which the ascertained frequency distribution is to be assigned is indicated.

45. Method according to claim 42, wherein the ascertained frequency distribution is added to the corresponding frequency distribution of the language established.

46. Method according to claim 42, wherein all non-letter characters, apart from spaces, are removed from the string of characters of the text, in order to ascertain from the string of characters thus obtained frequency distributions of letters and groups of letters in the text.

47. Method according to claim 42, wherein a complete alphabet is used, also including special letters of various languages based on Latin letters.

48. Method of controlling a speech reproduction unit, in which
a language identification according to claim 42, is carried out for a text to be output in spoken form by means of a speech synthesis module in spoken form by means of a speech synthesis module of the speech reproduction unit,
the language thereby established is transmitted to the speech reproduction unit, and
in the speech reproduction unit, the pronunciation rules of the language established are selected and used for the synthetic speech reproduction of the text by the speech synthesis module.

49. Method of identifying a language in which a text is composed as a string of characters, in which
a frequency distribution of letters in the text is ascertained,
the ascertained frequency distribution is compared with corresponding frequency distributions of available languages, in order to ascertain similarity factors which indicate the similarity of the language of the text with the available languages, and
the language for which the ascertained similarity factor is the greatest is established as the language of the text,
wherein the length of the text is established and, depending on the length of the text, one, two or more frequency distributions of letters and groups of letters in the text are ascertained.

50. Method according to claim 49, wherein the language is only established if the greatest similarity factor ascertained is greater than a threshold value.

51. Method according to claim 49, wherein the ascertained frequency distribution is stored as the frequency distribution of a new language or is added to a corresponding frequency distribution of a language if, in response to an inquiry, a language to which the ascertained frequency distribution is to be assigned is indicated.

52. Method according to claim 49, wherein the ascertained frequency distribution is added to the corresponding frequency distribution of the language established.

53. Method according to claim 49, wherein all non-letter characters, apart from spaces, are removed from the string of characters of the text, in order to ascertain from the string of characters thus obtained frequency distributions of letters and groups of letters in the text.

54. Method according to claim 49, wherein the frequency distributions of groups of letters with three letters, of groups of letters with two letters and of individual letters are ascertained if the number of letters in the text is greater than the square of the number of letters in the alphabet.

55. Method according to claim 54, wherein the frequency distributions of groups of letters with two letters and of individual letters are ascertained if the number of letters in the text is greater than the number of letters in the alphabet.

56. Method according to claim 54, characterized in that the frequency distribution of individual letters is ascertained if the number of letters in the text is less than the number of letters in the alphabet.

57. Method according to claim 49, wherein a complete alphabet is used, also including special letters of various languages based on Latin letters.

58. Method of controlling a speech reproduction unit, in which
a language identification according to claim 49 is carried out for a text to be output in spoken form by means of a speech synthesis module of the speech reproduction unit,
the language thereby established is transmitted to the speech reproduction unit, and
in the speech reproduction unit, the pronunciation rules of the language established are selected and used for the synthetic speech reproduction of the text by the speech synthesis module.

* * * * *

UNITED STATES PATENT AND TRADEMARK OFFICE
CERTIFICATE OF CORRECTION

PATENT NO. : 6,711,542 B2
DATED : March 23, 2004
INVENTOR(S) : Wolfgang Theimer

It is certified that error appears in the above-identified patent and that said Letters Patent is hereby corrected as shown below:

Title page,
Item [75], Inventor, "Wofgang" should be -- Wolfgang --

Column 14,
Line 9, "claim 35" should be -- claim 31 --

Signed and Sealed this

Twenty-eighth Day of September, 2004

JON W. DUDAS
*Director of the United States Patent and Trademark Office*